US011982563B1

(12) United States Patent
Staats et al.

(10) Patent No.: US 11,982,563 B1
(45) Date of Patent: May 14, 2024

(54) LOW POWER NETWORK CONNECTED APPARATUS

(71) Applicant: AMAZON TECHNOLOGIES, INC., Seattle, WA (US)

(72) Inventors: Andrew William Staats, Issaquah, WA (US); Charles Robert Watson, Santa Clara, CA (US); David Buuck, Prunedale, CA (US); Dave Jonathan Lefkow, Bellevue, WA (US); Paul Ellis, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 765 days.

(21) Appl. No.: 17/035,409

(22) Filed: Sep. 28, 2020

(51) Int. Cl.
*G01G 23/37* (2006.01)
*G06F 1/00* (2006.01)
*G08C 17/02* (2006.01)

(52) U.S. Cl.
CPC ..... *G01G 23/3707* (2013.01); *G01G 23/3735* (2013.01); *G06F 1/00* (2013.01); *G08C 17/02* (2013.01)

(58) Field of Classification Search
CPC .. G01G 23/3707; G01G 23/3735; G06F 1/00; G08C 17/02
See application file for complete search history.

(56) References Cited

U.S. PATENT DOCUMENTS

| 2018/0276039 | A1* | 9/2018 | Boesen | H04M 15/00 |
| 2019/0124433 | A1* | 4/2019 | Jo | H04R 1/1025 |
| 2021/0149736 | A1* | 5/2021 | Kondapuram | G06F 11/3058 |

OTHER PUBLICATIONS

"BH66F5250 24-Bit Delta Sigma A/D Flash MCU Integrated Regulator & OPA", Holtek, Revision V1.30, Dec. 2, 2019, 217 pgs. Retrieved from the Internet: URL: https://www.holtek.com/documents/10179/116711/BH66F5250v130.pdf.
"BH66F5250", Holtek, Product Details, 3 pgs. Retrieved from the Internet: URL: https://www.holtek.com/productdetail/-/vg/bh66F5250.
"Low Power Mode and Power Measurement", MEDIATEK Labs, Resources, Tutorials, 16 pgs. Retrieved from the Internet: URL: https://docs.labs.mediatek.com/resource/mt7687-mt7697/en/tutorials/low-power-mode-and-power-measurement.

(Continued)

*Primary Examiner* — Terrell S Johnson
(74) *Attorney, Agent, or Firm* — Lindauer Law, PLLC

(57) ABSTRACT

An apparatus powered by batteries may include a first processor and a second processor. The first processor may consume more electrical power than the second processor. The second processor acquires data from one or more sensors. At a predetermined time or other trigger, the second processor activates the first processor that is then used to send the acquired data to an external device. For example, items are stowed on the apparatus that includes weight sensors. The second processor awakens hourly, acquires weight data indicative of the weight of items stowed on the apparatus, and returns to a sleep mode. After 24 hours of acquiring weight data, the second processor activates the first processor to send the accumulated weight data to an external device, such as a server, using a network interface. Power consumption is substantially reduced, allowing the apparatus to operate without external power for extended periods of times.

20 Claims, 4 Drawing Sheets

(56) References Cited

OTHER PUBLICATIONS

"MT7697 Data Sheet", MEDIATEK Labs, Data Sheet, Version 1.01, May 10, 2016, 81 pgs. Retrieved from the Internet: URL: https://labs.mediatek.com/en/download/njdlGO4b.

"MT7697", Mediatek Labs, Overview, 5 pgs. Retrieved from the Internet: URL: https://labs.mediatek.com/en/chipset/MT7697.

* cited by examiner

LOW POWER NETWORK CONNECTED APPARATUS

BACKGROUND

Devices that use a network connection may operate without the benefit of an external power source. By reducing power consumption, these devices may be used in a variety of applications and operate for longer periods of time, reducing or eliminating the need for battery replacement, recharge, and so forth.

BRIEF DESCRIPTION OF FIGURES

The detailed description is set forth with reference to the accompanying figures. The use of the same reference numbers in different figures indicates similar or identical items or features. The figures are not necessarily drawn to scale, and in some figures, the proportions or other aspects may be exaggerated to facilitate comprehension of particular aspects.

Figure 1:
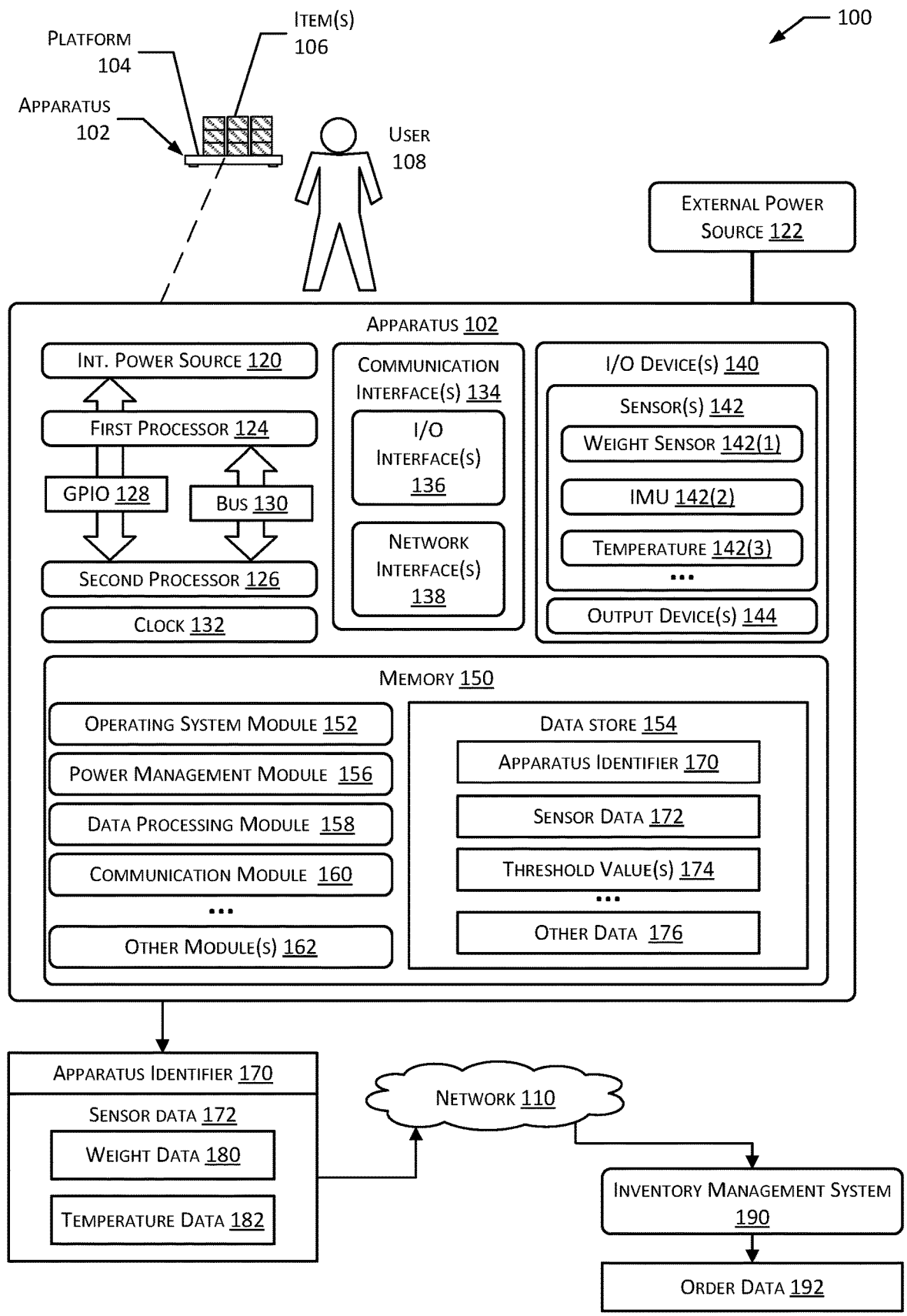
FIG. 1 illustrates a system that includes a low power network connected apparatus, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Sensors may be used to acquire sensor data that facilitates many different types of users. In one situation, sensors at a facility such as a home or business may be used to provide information about conditions at the facility. For example, the facility may utilize an apparatus to determine inventory levels of one or more items that are on hand. The apparatus may include a platform upon which items may be placed. For example, items may be stacked on the platform, placed into a storage rack or container that is on the platform, and so forth. The apparatus includes one or more weight sensors that generate weight data indicative of a weight of a load on the platform. That weight data includes the weight of the items that remain on the platform of the apparatus.

Some quantity of items of the same type are stowed on the apparatus. The items may be stowed as individual units, packages of several individual units, and so forth. For example, the apparatus may store a particular type of coffee in 1 kilogram (kg) containers and four-packs in which four individual 1 kg containers are bundled together.

Users may perform interactions, such as removing or "picking" items from the platform or "placing" items onto the platform of the apparatus. These interactions change the total weight of the items on the platform. For example, a "pick" will reduce the total weight on the platform by the weight of the item which was removed. In another example, a "place" will increase the total weight on the platform by the weight of the item that was put on the platform. By dividing the total of the weight measured at a particular time by the weight of an individual item, a quantity on hand (QOH) on the platform of the apparatus can be calculated.

The apparatus may acquire sensor data and send that sensor data to an external device, such as a server. For example, the apparatus may acquire weight data every 60 minutes, and once every 24 hours sends the acquired weight data to a server executing an inventory management system. The inventory management system may use the weight data to determine whether to generate an order to replenish the items associated with the apparatus.

Components within the apparatus use electrical power during operation. The electrical power may be supplied from an external power source or from an internal power source. For example, the external power source may convert alternating current from electrical mains to 5 V direct current (DC) for use by the components in the apparatus. In another example, the internal power source may comprise a primary battery, rechargeable battery, capacitor, fuel cell, photovoltaic cell, and so forth. Continuing the example, the internal power source may comprise a plurality of user-replaceable non-rechargeable primary cell batteries.

In many situations, while the apparatus is connected to the external power source, no constraints on power consumption may be expected. For example, so long as power is provided by the external power source, the apparatus may operate. However, while operating from only the internal power source, the apparatus experiences a constraint on power consumption. As the components within the apparatus operate, they consume electrical power, depleting the electrical power available from the internal power source. Some components consume more electrical power than others. For example, a radio transceiver may consume more electrical power than a microcontroller. Some components may operate in different modes with corresponding different electrical power requirements. For example, a processor may be capable of operating in a wake mode to process commands and a sleep mode in which the processor awaits an external signal or watchdog timer to resume the wake mode. The wake mode may consume more electrical power than the sleep mode.

Traditional techniques for reducing power consumption in a device involve transitioning a processor between various states such as a low power mode in which an onboard processor clock operates at a first frequency, a high power mode in which the onboard processor clock operates at a second frequency greater than the first, and so forth. To take an action, these traditional techniques involve restoring the processor to the high power mode. For example, receipt of an interrupt or polling sensors for sensor data would involve the traditional system transitioning the sole processor to the high power mode. As a result, the length of time the processor remains in high power mode and consuming electrical power is substantial. Additionally, the low power mode of traditional processors still consumes a relatively large amount of electrical power, such as on the order of hundreds of microamps. Over time, this results in substantial power consumption.

Described in this disclosure is an apparatus and techniques for low power operation that allows the apparatus to operate for extended periods of time. For example, when operating on the internal power source, the apparatus is able to acquire sensor data and deliver that data to the external device using a communication interface, such as a transceiver to connect to a Wi-Fi local area network, cellular data network, and so forth. The low power consumption provides an extended operational lifetime using limited power available in the internal power source. For example, the apparatus may operate for several years without replacement of alkaline batteries in the internal power source.

The low power operation of the apparatus utilizes a first processor and a second processor. The first processor may perform various functions such as establishing and managing communications with the external device. For example, the first processor may be used to authenticate communications, encrypt and decrypt communications, and so forth. The first processor may also configure or program the second processor. While active, the first processor may consume more electrical power than the second processor. The second processor may comprise a microcontroller unit that is able to transition between a wake mode and a sleep mode. The second processor may include or receive signals or data from a clock, counter, timer, or other device. The low power operation leverages the capabilities of the respective processors to minimize the time that each is active or in wake mode and consuming electrical power. As a result, overall power consumption is substantially reduced compared to high power operation in which the processors remain active and in wake mode.

During low power operation, upon initial start of the apparatus, the first processor is activated. The first processor may establish communication with the external device, receive configuration settings from the external device, implement those configuration settings, and so forth. For example, the first processor may use a communication interface to connect to a wireless access point, acquire a network address, and so forth. The first processor may configure the second processor. For example, the first processor may send firmware to the second processor to configure the operation of the second processor.

The second processor, once the firmware has been loaded, may send a signal to deactivate the first processor. The first processor may be deactivated, for example by shutting down or being turned off. For example, the power management unit of the first processor may be deactivated, removing power from the first processor and also preventing quiescent power consumption by the otherwise unused power management unit. The second processor may set a watchdog timer or use another mechanism to transition between a sleep mode and a wake mode. For example, the second processor may set a watchdog timer to transition from the sleep mode to the wake mode in 60 minutes. After transitioning to the wake mode, the second processor acquires sensor data from the one or more sensors and stores this data. If the second processor is not due to send the acquired sensor data to the external device, the second processor resets the watchdog timer and transitions to the sleep mode. When the second processor is due to send the acquired sensor data, the second processor sends a signal to activate the first processor.

Once activated, the first processor may establish communication with the second processor and receive the sensor data that has been stored by the second processor. The first processor may then establish communication with the external device and send the sensor data to the external device. With the transfer of the sensor data complete, the second processor may again set the watchdog timer and then transition to the sleep mode. Meanwhile, the first processor may complete any outstanding tasks such as receiving and processing any updates. Once complete, the first processor is deactivated.

Additional techniques may also be used to further reduce power consumption. For example, the second processor may vary a schedule of waking the first processor based on the sensor data received. Continuing the example, if no change in the values of the sensor data is determined, the second processor may increase the wait until the first processor is activated.

Reduced power consumption may also be realized while reducing latency for the system to respond to changes in sensor data. For example, if a value in the sensor data exceeds a threshold value, the second processor may activate the first processor in advance of a previously scheduled time and send the sensor data. This allows the apparatus to report changes more quickly, while conserving electrical power.

By using the low power operation described in this disclosure, the overall power consumption of the apparatus is substantially reduced. While using an internal power source, the apparatus minimizes the amount of time that a processor is consuming electrical power while idle.

Illustrative System

FIG. 1 illustrates a system 100 that includes a low power network connected apparatus (apparatus) 102, according to some implementations. The apparatus 102 may have a platform 104. The platform 104 may support, or be replaced with, other structures to stow items 106, such as containers, bins, hangers, and so forth. A user 108, robot, and so forth may place one or more items 106 on the platform 104.

A facility may have one or more apparatuses 102. The facility may comprise a residence, business, public space, and so forth. For example, where the apparatus 102 is used to stow items 106, a single facility may have several apparatuses 102 that store the same type of items 106 or different types of items 106.

The apparatus 102 includes one or more components that utilized electrical power during operation. One or more power sources may be configured to provide the electrical power suitable for operating the components in the apparatus 102. The one or more power sources may comprise batteries, capacitors, fuel cells, photovoltaic cells, wireless power receivers, conductive couplings suitable for attachment to a power source such as provided by an electric utility, and so forth.

The apparatus 102 may be powered by one or more of an internal power source 120 or an external power source 122. The internal power source 120 may include one or more of a power management unit (PMU), a power management integrated circuit (PMIC), voltage converter, buck or boost circuitry, battery management circuitry, and so forth.

The internal power source 120 may comprise a primary battery, rechargeable battery, capacitor, fuel cell, photovoltaic cell, and so forth. For example, the internal power source 120 may comprise a plurality of user-replaceable non-rechargeable primary cell batteries using alkaline chemistry. The external power source 122 may provide electrical power from one or more sources. For example, the external power source 122 may convert alternating current from electrical mains to 5 V direct current (DC) for use by the components in the apparatus 102. In another example, the external power source 122 may comprise one or more rechargeable batteries. A total power capacity of the internal power source 120 is less than the external power source 122. For example, primary cell batteries used as the internal power source 120 within the apparatus 102 may have a total capacity of 2 amp-hours, while the external power source 122 is effectively unlimited. To provide for operation of the apparatus 102 over an extended period of time, the apparatus 102 may use the low power mode described herein when the external power source 122 is not providing electrical power.

The apparatus 102 includes at least a first processor 124 and a second processor 126. The first processor 124 may comprise a microprocessor, field-programmable gate array, and so forth. The first processor 124 may comprise an application processor to execute instructions and perform various functions such as establishing and managing communications with the external device. For example, the first processor 124 may be used to establish a network connection, authenticate communications, encrypt and decrypt communications, and so forth. In one implementation, the first processor 124 may comprise a MT7697 device from MediaTek Inc. of Hsinchu, Taiwan. In some implementations the first processor 124 may comprise a system that includes one or more processor cores, memory, communication interfaces, one or more power management components, and so forth. For example, the first processor 124 may comprise an associated power management unit (PMU) that operates as a direct current (DC) to DC converter, under-voltage lockout circuit, low drop-out regulators, buck converters, and so forth. In other implementations the first processor 124 may comprise a communication processor, such as a device that includes a wireless communication interface 134.

The first processor 124 may also configure or program the second processor 126 to execute one or more stored instructions. While active, the first processor 124 may consume more electrical power than the second processor 126. The second processor 126 may comprise a microcontroller unit (MCU) that is able to transition between a wake mode and a sleep mode. The second processor 126 may comprise a microcontroller, field-programmable gate array, application specific integrated circuit (ASIC), and so forth. The second processor 126 consumes a first amount of electrical power while in the wake mode, and a second amount of electrical power while in the sleep mode that is less than the first amount of electrical power. The second processor 126 may include or receive signals or data from a clock, counter, timer, or other device. For example, the second processor 126 may include a watchdog timer (WDT). The second processor 126 may include the capability to transition from the sleep mode to the wake mode responsive to expiration of the WDT. For example, the second processor 126 may "wake itself up" when a preset interval as measured by the WDT has elapsed. Compared to the first processor 124, the second processor 126 may have fewer transistors, a lower maximum clock frequency, less memory, and so forth. In one implementation the second processor 126 may comprise a BH66F5250 from Holtek Semiconductor, Inc. of Hsinchu, Taiwan.

The first processor 124 may have a first set of general purpose input/output (GPIO) 128 or other lines. The second processor 126 may have second set of GPIO 128 or other lines. The first set of GPIO 128 lines may be connected to one or more of the internal power source 120, the second set of GPIO 128 lines, or other devices. The second set of GPIO 128 lines may be connected to one or more of the internal power source 120, the first set of GPIO 128 lines, or other devices. For example, the second set of GPIO lines 128 may connect the second processor 126 to the PMU that that provides electrical power to the first processor 124. This allows the second processor 126 to control the PMU, allowing the second processor 126 to activate or deactivate the PMU and thus the first processor 124 that obtains electrical power from the PMU.

These electrical connections allow the first processor 124 and the second processor 126 to send and receive signals to connected devices. For example, the second processor 126 may assert a first voltage on a line to a power management unit (PMU) of the first processor 124 to activate the PMU to provide power to, and thus activating the first processor 124. In another example, the first processor 124 may assert a second voltage on a second line of the second processor 126 to transition the second processor 126 from the sleep mode to the wake mode.

A bus 130 provides communication between the first processor 124, the second processor 126, and may also provide communication with other devices such as the I/O devices 140. In one implementation, the bus 130 may comprise an Inter-Integrated Circuit (I2C) serial communication bus. The bus 130 may be used to send data between the connected components. For example, the second processor 126 may send sensor data 172 to the first processor 124 using the bus 130.

The apparatus 102 may include a clock 132 to provide information indicative of date, time, ticks, and so forth. For example, the first processor 124, the second processor 126, or other devices may use data from the clock 132 to associate sensor data 172, such as weight data 180, with a particular point in time. In some implementations the clock 132 may be synchronized to an external time source. For example, a simple network time protocol (SNTP) executing on the first processor 124 may be used to synchronize the clock 132 to an external time source.

The apparatus 102 may include one or more communication interfaces 134 such as input/output (I/O) interfaces 136, network interfaces 138, and so forth. The communication interfaces 134 enable the apparatus 102, or components thereof, to communicate with other devices or components. The I/O interfaces 136 may comprise Serial Peripheral Interface bus (SPI), Universal Serial Bus (USB) as promulgated by the USB Implementers Forum, RS-232, and so forth. The apparatus 102 may also include one or more busses 130 or other internal communications hardware or software that allow for the transfer of data between the various modules and components of the apparatus 102.

The network interfaces 138 may be configured to provide communications between the apparatus 102 and external devices such as routers, access points, smartphones, servers, and so forth. The network interfaces 138 may include devices configured to couple to personal area networks (PANs), local area networks (LANs), wireless local area networks (WLANS), wide area networks (WANs), and so forth. For example, the network interfaces 138 may include devices compatible with Ethernet, Wi-Fi, Bluetooth, ZigBee, LTE, 5G, and so forth. Continuing the example, the network interface 138 may include one or more wireless transceivers that comprise a radio receiver and a radio transmitter. In other implementations other wireless methodologies may be used. For example, the network interfaces 138 may include acoustic transceivers, optical transceivers, and so forth.

The apparatus 102 may include one or more I/O devices 140, such as sensors 142, output devices 144, and so forth.

In some embodiments, the I/O devices 140 may be physically incorporated with the apparatus 102 or may be externally placed.

The sensors 142 may include one or more weight sensors 142(1). The weight sensors 142(1) may include load cells, force sensitive resistors, or other transducers that can determine a load on the platform 104. For example, the weight sensors 142(1) may comprise resistive strain gauges. The weight sensors 142(1) may be used to measure a weight supported by the platform 104. Output from these weight sensors 142(1) is used to generate weight data 180.

The sensors 142 may include an inertial measurement unit (IMU) 142(2) that may include one or more accelerometers, gyroscopes, gyrometers, and so forth. The IMU 142(2) may generate movement data indicative of linear movement or rotation. The movement data may be used by the first processor 124 or the second processor 126 to determine if the apparatus 102 has been moved, presence of vibration at a given time, and so forth. For example, if the movement data indicates movement that exceeds a threshold value, a calibration operation may be performed. Continuing the example, the movement data may indicate that the apparatus 102 has been dropped. Responsive to this determination, the calibration operation may be performed. In another example, the movement data may be used to determine whether vibration of the apparatus 102 exceeds a vibration threshold. In response to this determination, the second processor 126 may skip acquiring sensor data 172, set the watchdog timer, and wait for the vibration to decrease below the vibration threshold before acquiring sensor data 172.

The apparatus 102 may include a temperature sensor 142(3) to generate sensor data 172 comprising temperature data 182. In one implementation, the temperature data 182 may be used to compensate for temperature effects on other sensors 142. For example, the weight sensors 142(1) may have a specified operating temperature range. If the temperature data 182 indicates a temperature value that is outside the specified operating temperature range, the resulting weight data 180 may be flagged as being potentially inaccurate. In another example, a correction factor associated with a temperature value may be applied to the weight data 180 to determine compensated data. The compensated data may then be used to determine a count of items 106 at the apparatus 102.

Another sensor 142 the apparatus 102 may include is a hygrometer to generate humidity data indicative of humidity. The humidity data may be used as an additional parameter to determine the compensated data. For example, operation of the weight sensors 142(1) may change based on the relative humidity. A lookup table or other data structure may be used to associate a particular humidity value with a correction factor that is applied to weight data 180 to determine compensated data.

Another sensor 142 the apparatus 102 may include is a button to accept input from a user 108. For example, the button may comprise a switch, capacitive sensor, or other device.

The apparatus 102 may include one or more other sensors 142. For example, the apparatus 102 may include a radio frequency identification (RFID) reader, near field communication (NFC) systems, and so forth, to read data from tags on the items 106, in the surrounding environment, and so forth. Continuing the example, the RFID reader may be used to provide information that is then used to determine the type of item 106 that is present on the platform 104, to determine if more than one type of item 106 is present on the platform 104, and so forth. In another example, the RFID reader may be used to interrogate and read a tag associated with a piece of furniture, and so forth. For example, the RFID may read a tag that designates a particular location within the facility, such as "break room 3" or "kitchen pantry". This information may be used to facilitate operation of the system 100, such as by specifying where a replenishment order is to be delivered to facilitate restock.

The apparatus 102 may include other sensors 142 as well. For example, the apparatus 102 may include a global positioning system (GPS) receiver, GLONASS receiver, cellular network transmitter or receiver, or other device to determine where the apparatus 102 is physically located. This information may be used to facilitate operation of the system 100, such as by determining the apparatus location so the resulting order data 192 indicates where to deliver replenishment stock.

The output devices 144 may include one or more of an indicator light, display device, printer, audio speakers, and so forth. For example, the output devices 144 may comprise a multicolor light emitting diode (LED). The multicolor LED may be operated to provide as output a particular color, sequence of colors, particular pattern over time such as a slow blink or rapid blink, and so forth.

The apparatus 102 includes one or more memories 150. For example, the first processor 124 may have a first memory 150(1), the second processor 126 may have a second memory 150(2), or the first processor 124 and the second processor 126 may share memory 150. The memory 150 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 150 provides storage of computer-readable instructions, data structures, program modules, and other data for the operation of the apparatus 102. A few example functional modules are shown stored in the memory 150, although the same functionality may alternatively be implemented in hardware, firmware, and so forth.

The memory 150 may include at least one operating system (OS) module 152. The OS module 152 is configured to manage hardware resource devices such as the communication interfaces 134, the I/O interfaces 136, the I/O devices 140, and so forth. In some implementations the OS module 152 may be omitted from one or more of the first processor 124 or the second processor 126.

Also stored in the memory 150 may be a data store 154 and one or more of the following modules. These modules may be executed as foreground applications, background tasks, daemons, and so forth. The data store 154 may use a flat file, database, linked list, tree, executable code, script, or other data structure to store information. In some implementations, the data store 154 or a portion of the data store 154 may be distributed across one or more other devices including computing devices, network attached storage devices, and so forth.

The memory 150 may include a power management module 156 that is configured to implement the low power mode of the apparatus 102. One or more of the functions associated with the power management module 156 may be distributed between the first processor 124 and the second processor 126. For example, as described with regard to FIGS. 2 and 3, some operations may be performed by the first processor 124 while others are performed by the second processor 126. In some implementations, one or more of the functions associated with the power management module 156 may be distributed between one or more of the first processor 124, the second processor 126, a power management unit (PMU), a power management integrated circuit (PMIC), or other device.

A data processing module 158 may be used to process sensor data 172. For example, the second processor 126 may acquire the sensor data 172 and send the sensor data 172 to the first processor 124. The data processing module 158 executing on the first processor 124 may perform various functions such as filtering the sensor data 172, determining a difference between sensor values, determining statistics of the sensor values, and so forth.

A communication module 160 executing on the first processor 124 may be configured to establish communications with external devices via with the network 110. For example, the communication module 160 may establish a connection to the network 110, provide authentication, encrypt data, decrypt data, and so forth. The communication module 160 may be executed by the first processor 124.

The data store 154 may also store an apparatus identifier 170. The apparatus identifier 170 is indicative of a particular apparatus 102. For example, the apparatus identifier 170 may comprise a serial number, media access control (MAC) address, network address, and so forth.

The second processor 126 may use the one or more sensors 142 to acquire sensor data 172. The sensor data 172 may be stored in the memory 150 accessible to the second processor 126. For example, the second processor 126 may store the sensor data 172 in internal memory. The sensor data 172 may include weight data 180 acquired from one or more weight sensors 142(1), temperature data 182 acquired from one or more temperature sensors 142(3), and so forth.

The data store 154 may include one or more threshold values 174. For example, the threshold values 174 may indicate a first time interval between acquiring sensor data 172, a second time interval between sending the acquired sensor data 172 to the external device, and so forth.

The data store 154 may include other data 176. For example, the other data 176 may include information such as a count of times in a third time interval that the sensor data 172 has been sent to the external device, and so forth.

During operation, the apparatus 102 sends information to an external device. The apparatus 102 may use one or more networks 110 to send the information. For example, the network 110 may comprise a personal area network (PAN) such as implemented using Bluetooth or may include a wireless local area network (WLAN) such as Wi-Fi. The apparatus 102 may include the apparatus identifier 170 to facilitate operation of the external device. In one implementation, information sent by the apparatus 102 such as the apparatus identifier 170 and sensor data 172 may be sent via the network 110 to an inventory management system 190.

The inventory management system 190 may comprise one or more computing devices that perform various functions. For example, the inventory management system 190 may comprise a plurality of servers. These functions may include but are not limited to determining, or facilitating the determination of, when the quantity on hand (QOH) of a particular type of item 106 at an apparatus 102 or a facility has dropped below a reorder quantity threshold, and then generating an order to replenish those items 106. An order may be generated to replenish the stock of the items 106 stowed at a particular apparatus 102 at a particular location, or to replenish stock of the items 106 at multiple apparatuses 102(1), 102(2), and so forth at the facility. In some implementations the inventory management system 190 may provide a notification to the user 108 suggesting movement of stock from one location in the facility to another. For example, if the QOH of the item 106 stowed on apparatus 102(1) is depleted below the reorder quantity threshold, a notification may be sent to a user device such as a smartphone, tablet, workstation, and so forth. The user device may present the notification that suggests moving some stock of the items 106 from the other stock on hand to the apparatus 102(1).

The inventory management system 190 may access a data store that stores item data, account data, and so forth. The item data may include an item identifier, package quantity, per item weight, and so forth. The item identifier is indicative of a particular type of item 106. For example, the item identifier value of "53617261204l6e6e65" may be representative of a particular brand, flavor, and package size of coffee. The package quantity may include a number of units of items 106 present in a single package. Some items 106 may be sold in multi-unit packages. Continuing the example, a particular item identifier may be indicative of a four-pack of four separate 1 kg units of coffee that have been bundled together for sale. The per item weight comprises data indicative of an expected weight of each item 106. For example, the per item weight may comprise an average weight of a sample of items 106.

In other implementations, the item data may include other information. For example, the item data may include data that indicates equivalent or replacement alternatives for a particular type of item 106. For example, the item data may include information that indicates other item identifiers that represent the same type of item 106 but with different package quantities. In another example, the item data may include an alternative or equivalent selection that may be ordered as an alternative to that particular type of item 106.

The inventory management system 190 may use the weight data 180 to determine whether to generate order data 192. For example, the inventory management system 190 may use the apparatus identifier 170 to determine account data associated with the apparatus 102. The account data may indicate a reorder quantity such that if the QOH at the apparatus 102 drops below a threshold amount, order data 192 is generated. This is discussed in more detail with regard to FIG. 4.

Other modules 162 may also be present in the memory 150. For example, the apparatus 102 may include a server module to serve a web page to an external device, such as a smartphone.

Figure 2:
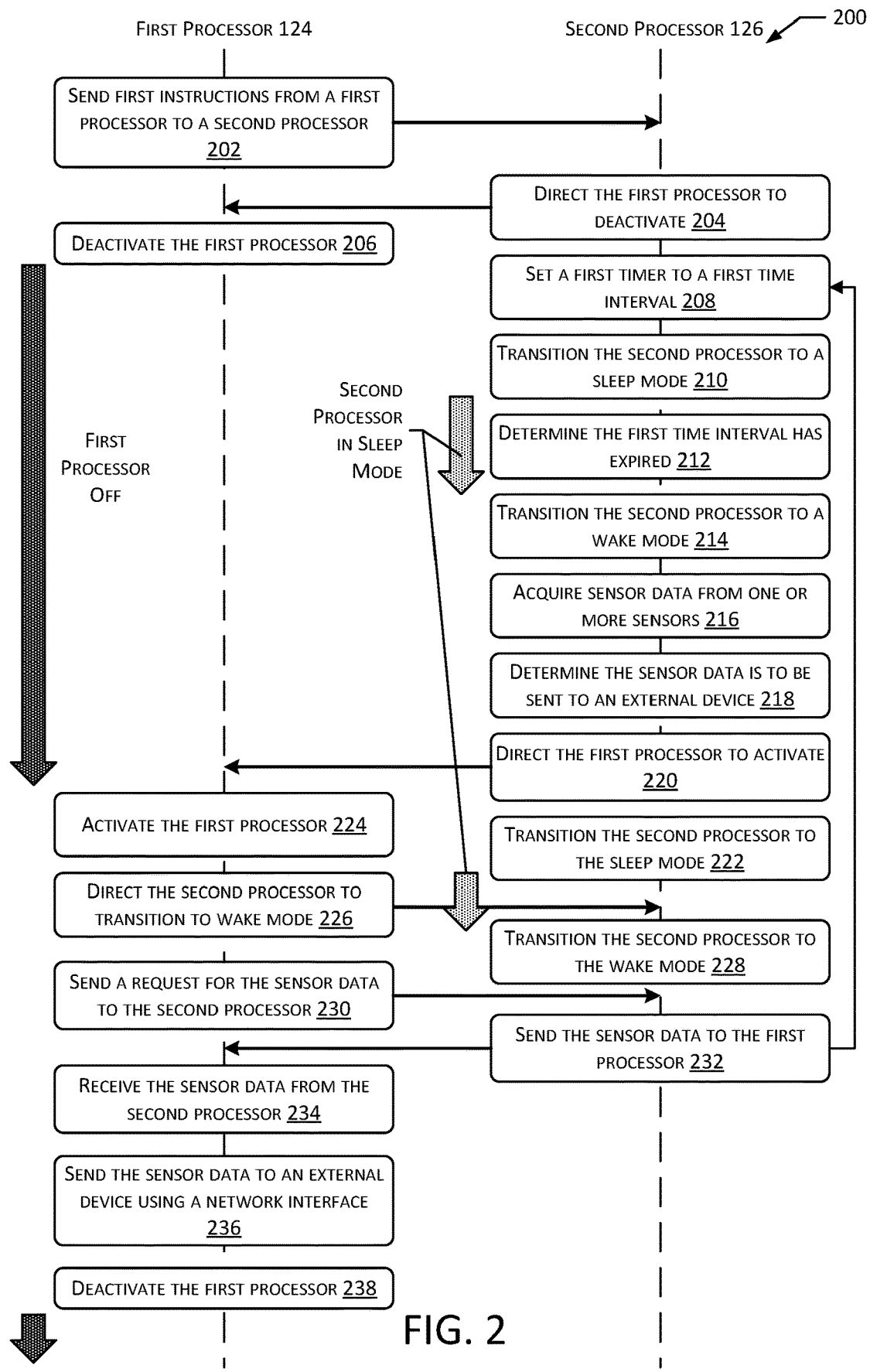
FIG. 2 is a flow diagram of a process for low power operation of an apparatus, according to one implementation.

FIG. 2 is a flow diagram 200 of a process for low power operation of an apparatus 102, according to one implementation. The low power operation may result from the actions of the first processor 124 and the second processor 126 as described. In this illustration, time increases down the page. For example, actions described at the top of the page may occur before those actions described at the bottom of the page. In other implementations the order of the actions described herein may be changed. The process described herein may be used while the apparatus 102 is using electrical power from the internal power source 120. In some implementations, while the apparatus 102 is receiving electrical power from the external power source 122, this process may be omitted and the various components of the apparatus 102 may remain in their activated state, wake mode, and so forth.

At 202 the first processor 124 is active and the second processor 126 is in a wake mode. At 202 first instructions are sent from the first processor 124 to the second processor 126. For example, the first processor 124 may use the bus 130 to send firmware to configure the second processor 126 for operation. In some implementations, before sending the first instructions, the first processor 124 may perform a check to determine if the second processor 126 is in a predetermined state. For example, the first processor 124 may send first data, determine if an expected response of second data has been received, and so forth. The first instructions are loaded into the second processor 126 and executed.

At 204, as specified in the first instructions, the second processor 126 directs the first processor 124 to deactivate. For example, the second processor 126 may use the GPIO 128 to assert a signal on a line of the PMU that provides power to the first processor 124 to deactivate the first processor 124. Responsive to the signal, the PMU ceases providing electrical power to the first processor 124. In another example, the second processor 126 may send a deactivation command to the first processor 124 using the bus 130. In some implementations, the first processor 124 may include a power management unit or other power management or conditioning circuitry. The deactivation may include deactivating the power management unit, that in turn results in deactivating the first processor 124. By deactivating the power management unit, quiescent power consumption from the otherwise unused power management unit is prevented, resulting in an additional reduction to power consumption. For example, the power management unit of the first processor 124 may be deactivated, removing power from the first processor 124 and also preventing quiescent power consumption by the otherwise unused power management unit.

At 206 the first processor 124 is deactivated. For example, the first processor 124 may be turned off, a clock used to operate the first processor 124 may be inactivated, and so forth. In some implementations a power management unit (PMU) or power management integrated circuit (PMIC) may disconnect the first processor 124 from the internal power source 120.

At 208 the second processor 126 sets a first timer to a first time interval. For example, a watchdog timer (WDT) of the second processor 126 may be set to 60 minutes.

At 210 the second processor 126 transitions from the wake mode to a sleep mode. For example, the second processor 126 may deactivate a clock used to operate the second processor 126, and so forth. The second processor 126 uses less electrical power while in sleep mode than while in wake mode.

At 212 the second processor 126, or a portion thereof such as the WDT, determines that the first time interval has expired or passed.

Responsive to the determination at 212, at 214 the second processor 126 transitions to the wake mode. For example, the WDT may provide an interrupt that directs one or more portions of the second processor 126 to be supplied with electrical power.

In some implementations the WDT may be unable to be set to a desired first time interval. For example, the WDT may only be able to set to a maximum supported timer interval of 8 seconds. In such an implementation, the WDT may be set to the maximum supported timer interval. As the WDT expires, the second processor 126 may transition from the sleep mode to the wake mode, increment a counter, and compare the counter to a threshold value. If the counter is less than the threshold value, the WDT is set again and the second processor 126 transitions from wake mode to sleep mode. If the counter is greater than the threshold value, the second processor 126 may maintain the wake mode and proceed to 216.

Accuracy of the clocks 132 in the apparatus 102, such as the WDT of the second processor 126, a clock of the first processor 124, or a realtime clock, may vary. During operation, the apparatus 102 may gather timestamp data and determine a correction value. For example, the WDT may be set to acquire the sensor data every 60 minutes. However, the WDT of the second processor 126 may run fast, and instead wakes up the first processor 124 every 58 minutes. The first processor 124 may determine timestamps associated with each activation, receipt of sensor data, or other activity. By calculating a difference between a first timestamp and a second timestamp, a correction value may be determined. The correction value may then be used to adjust one or more intervals. For example, the correction value may be used to set the WDT to 62 minutes, which may result in the WDT actually waking up at 60 minute intervals. A feedback loop may be employed to allow the correction value to be refined over time.

At 216 the second processor 126 acquires sensor data 172 from one or more of the sensors 142. For example, the second processor 126 may acquire one or more samples of weight data 180 from the weight sensors 142(1).

At 218 the second processor 126 determines if the sensor data 172 is to be sent to an external device. The determination to send the sensor data 172 to the external device, such as using the network 110 to send the sensor data 172 to the inventory management system 190, may be determine based on occurrence of one or more of the following events.

A first event may comprise a second time interval since last occurrence of sending of the sensor data 172. For example, when the sensor data 172 is sent by the first processor 124, a second timer may be set to a second time interval, such as 24 hours. If the second timer expires, the first processor 124 may send the sensor data 172 provided by the second processor 126. The second time interval may be greater than the first time interval. For example, the second time interval may be 24 hours while the first time interval is 60 minutes. Continuing the example, if the sensor data 172 has not been sent for 24 hours, the determination may be made to send the sensor data 172 to the external device.

A second event may comprise determining a count of the sensor data 172 that has been acquired exceeds a first threshold value. For example, if the count of samples of weight data 180 exceeds a predetermined threshold, the determination may be made to send the sensor data 172 to the external device. In another example, if the sensor data 172 stored by the second processor 126 exceeds a threshold value, such as a storage buffer being full, the determination may be made to send the sensor data 172 to the external device.

A third event may comprise determining a third time interval since last use of the first processor 124 to send the sensor data 172 has exceeded a second threshold value. For example, if the first processor 124 has not sent the sensor data 172 for a third time interval, such as 36 hours, the determination may be made to send the sensor data 172 to the external device.

A fourth event comprise a determination that the sensor data 172 is indicative of a change that exceeds a threshold value. In one implementation, a difference between a first value of the sensor data 172 and a second value of the sensor data 172 may be determined. If the difference exceeds a third threshold value, the determination may be made to send the sensor data 172 to the external device. For example, a change in weight values that exceeds 100 grams may trigger an event to send the sensor data 172 to the external device. In another implementation, if a most recent value of the sensor data 172 is less than a threshold value, the determination may be made to send the sensor data 172 to the external device. For example, if the latest weight value is less than a threshold value of 750 grams, the first processor 124 will initiate the sending of the sensor data 172 to the external device.

A fifth event may comprise determining user input. For example, a user 108 pressing a button on the apparatus 102 may initiate the sending of the sensor data 172 to the external device.

A sixth event may comprise determining a count of entries in the sensor data 172 that have been acquired exceeds a threshold value. For example, the threshold may indicate that if 24 samples of sensor data 172 have been acquired, the sensor data 172 is to be sent to the external device.

At 220, responsive to the determination at 218, the second processor 126 directs the first processor 124 to activate. For example, the second processor 126 may use the GPIO 128 to assert a signal on a line of the PMU that provides electrical power to the first processor 124 to activate the first processor 124.

In some implementations, additional reductions in power consumption may be attained by placing the second processor 126 into the sleep mode while waiting for the first processor 124 to be ready. At 222 the second processor 126 transitions to the sleep mode.

At 224, responsive to the direction of the second processor 126, the first processor 124 is activated. For example, the power management unit of the first processor 124 may be turned on to provide power to the first processor 124, a clock used to operate the first processor 124 may be activated, and so forth. One or more other components may also be activated. For example, the network interface 138 may be activated. In some implementations the PMU or PMIC may connect the first processor 124 or the other components to the internal power source 120. The first processor 124 may proceed to activate, such as waiting for an internal clock to settle, loading a read only memory (ROM), and so forth. In some implementations, the first processor 124 may proceed to try and establish a connection with the network 110 using the network interface 138. For example, the first processor 124 may connect to a wireless access point, send a dynamic host control protocol (DHCP) request, and so forth.

At 226, the first processor 124 is now ready to proceed and directs the second processor 126 to transition to the wake mode. For example, the first processor 124 may use the GPIO 128 to assert a signal on a line of the second processor 126 to transition the second processor 126 to the wake mode. In another example, the first processor 124 may send an activation command to the second processor 126 using the bus 130.

At 228, responsive to the direction, the second processor 126 transitions to the wake mode.

At 230 the first processor 124 sends a request to the second processor 126 for the sensor data 172 that has been acquired by the second processor 126. For example, the first processor 124 may send a request command to the second processor 126 using the bus 130. In some implementations, the request may be omitted and the second processor 126 may send the sensor data 172 without a request.

At 232, responsive to the request, the second processor 126 sends the sensor data 172 to the first processor 124. For example, the second processor 126 may send the sensor data 172 stored in the memory 150(2) of the second processor 126 to the first processor 124 using the bus 130. Once the sensor data 172 has been sent, the second processor 126 may erase the sensor data 172 from its memory 150(2). For example, the second processor 126 may clear a sensor data buffer. In some implementations, once the send of the sensor data 172 has been completed, the second processor 126 may return to 208.

At 234 the first processor 124 receives the sensor data 172 from the second processor 126. The sensor data 172 may then be stored within the memory 150(1) of the first processor 124. In some implementations the data processing module 158 executing on the first processor 124 may perform one or more operations on the sensor data 172.

At 236, the first processor 124 sends the sensor data 172 to the external device using the network interface 138. For example, the first processor 124 uses the Wi-Fi interface to send the sensor data 172, such as the weight data 180 and the temperature data 182, to the inventory management system 190 via the network 110.

At 238 the first processor 124 is deactivated. In one implementation, the first processor 124 may execute instructions to deactivate itself by sending commands to the PMU or PMIC to disconnect the first processor 124 from the internal power source 120. In another implementation (not shown), the first processor 124 may send a notification to the second processor 126 that the sensor data 172 has been successfully sent. Responsive to this, the second processor 126 may direct the first processor 124 to deactivate. For example, the second processor 126 may use the GPIO 128 to assert a signal on a line of the PMU that provides electrical power to first processor 124, causing the PMU to deactivate and thus deactivating the first processor 124.

The second processor 126 may operate the one or more output devices 144 to present output to the user 108 while the first processor 124 is deactivated. For example, the second processor 126 may be configured to operate the multicolor LED light to provide a particular light output indicative of device state such as a low battery condition, successful transmit of data at last attempt by the first processor 124, system fault, sensor overload, and so forth.

Figure 3:
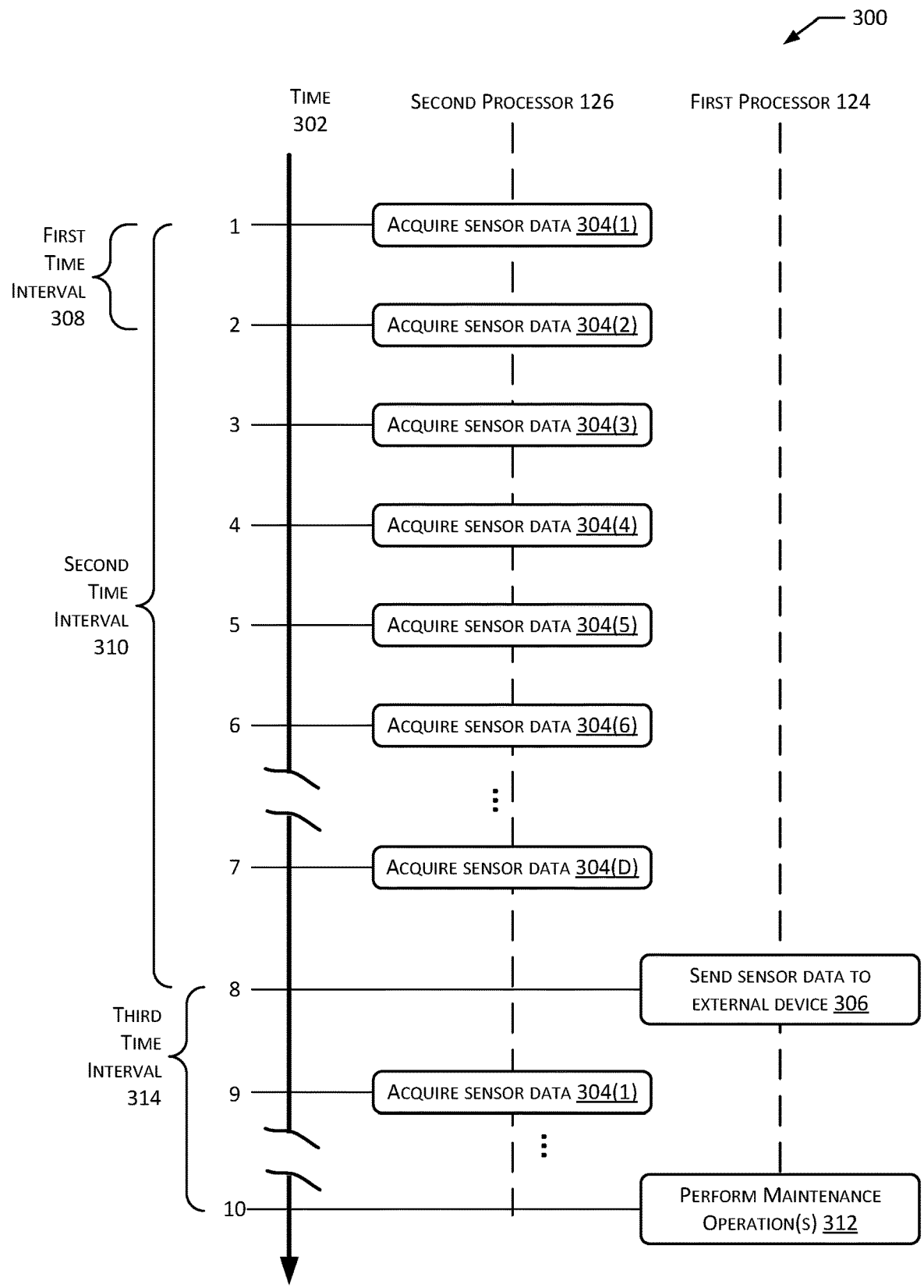
FIG. 3 illustrates a timeline of acquiring sensor data and sending that sensor data to an external device, according to one implementation.

FIG. 3 illustrates a timeline 300 of acquiring sensor data 172 and sending that sensor data 172 to an external device, according to one implementation. In this illustration, time 302 increases down the page. Also shown is the first processor 124 and the second processor 126.

The second processor 126 acquires sensor data 304 at times 1, 2, 3, . . . . These times are separated by a first time interval 308. For example, the first time interval 308 may be 60 minutes. The first time interval 308, or sampling interval, may be varied as needed. For example, an apparatus 102 operating in a high-volume commercial environment such as a busy retail store may use a first time interval 308 of 5 minutes. In another example, an apparatus 102 acquiring data indicative of water levels in a reservoir may use a first time interval 308 of 6 hours.

As described above with regard to FIG. 2, the first processor 124 may be deactivated and thus not consuming electrical power while the second processor 126 is acquiring sensor data 304. While acquiring sensor data 304, the second processor 126 itself only remains in the wake mode for a brief time, sufficient to acquire the sensor data 172 and in some implementations to determine if the sensor data 172 is to be sent to the external device 306.

A second time interval 310 specifies how often the first processor 124 will be activated to send the sensor data 172 to the external device 306. The second time interval 310 may be greater than the first time interval 308. The duration of the second time interval 310 may be determined based on the needs of the associated system for the sensor data 172. For example, the inventory management system 190 may be configured to generate order data 192 associated with an apparatus 102 on a batch schedule, once per day. In this example, the second time interval 310 may be 24 hours. More frequent transmissions may be deemed unnecessary as not affecting the order data 192, while less frequent transmission may be deemed to introduce the potential for too much delay in generating the order data 192 and attempting to fulfill that order.

At time 8, the second time interval 310 expires. As described with regard to FIG. 2, the first processor 124 may then be activated and used to retrieve and send the sensor data 172 acquired by the second processor 126 to the external device 306. Once the sensor data 172 has been sent, the first processor 124 may be deactivated as described above.

In some implementations, the time intervals used by the process described with regard to FIG. 2 may vary based on the sensor data 172. In one implementation, the first processor 124, the second processor 126, or another component of the apparatus 102 may provide data indicative of a voltage of the internal power source 120. For example, the second processor 126 may determine sensor data 172 indicative of a voltage of one or more batteries in the apparatus 102. Based on the voltage, one or more of the first time interval 308 or the second time interval 310 may be determined. For example, a lookup table may associate a particular voltage or range of voltages with a particular value of first time interval 308, a particular value of second time interval 310, and so forth. Continuing the example, as the battery voltage drops, the first time interval 308 may increase. The second time interval 310 may also be increased as well. This may allow the apparatus 102 to provide a graceful degradation in service as the internal power source 120 becomes exhausted.

In some implementations, the time intervals used by the process described with regard to FIG. 2 may be specified by an external device. For example, the inventory management system 190 or another system may send data indicative of one or more of the first time interval 308, or the second time interval 310.

In some implementations, the time intervals may be specified to correspond to a particular clock time. For example, it may be desired to have the apparatus 102 report weight data 180 after a worker shift change, after closing time, and so forth. In another example, the inventory management system 190 may allocate different times to send sensor data 172 for load balancing at the inventory management system 190. For example, the inventory management system 190 may specify a reporting time interval during which the apparatus 102 is expected to try and establish communication and send the sensor data 172. Continuing the example, the inventory management system 190 may specify that the apparatus 102 is to send data between 2 a.m. and 4 a.m.

Instead of using a timer to determine if the second time interval 310 is elapsed, the apparatus 102 may compare current time from the clock 132 to data indicative of the reporting time interval. If the current time is within the reporting time interval, the second processor 126 may proceed to activate the first processor 124 and send the sensor data 172. In some implementations, after the first comparison of current time with the reporting time, if no change to the reporting time interval is received, the second time interval 310 may be set to correspond to the next reporting time interval.

The apparatus 102 may perform one or more maintenance operations. These maintenance operations may include, but are not limited to, over the air (OTA) updates, sending log data or other information to an external device, performing one or more self-diagnostics, and so forth. In one implementation, one or more maintenance operations may be performed while the first processor 124 is active, such as following the sending of sensor data to the external device 306, and before the first processor 124 is deactivated. In some implementations the maintenance operations may be specified to occur at a particular time interval. The duration of the third time interval 314 may be determined based on the needs of the associated systems, desired operation, and so forth. For example, the apparatus 102 may be configured to perform maintenance operations during periods of time when the apparatus 102 is not expected to be used, such as during nighttime hours. The first processor 124 may perform one or more maintenance operations 312 at the expiration of a third time interval 314. As mentioned above, in some implementations, the third time interval 314 may be determined based on available power. For example, as battery voltage drops, the third time interval 314 may increase. In some implementations the inventory management system 190 may determine that the third time interval 314 associated with the device has been extended. Responsive to this, the inventory management system 190 may generate a notification for a user to check on the apparatus 102, replace the batteries, or take other action.

Figure 4:
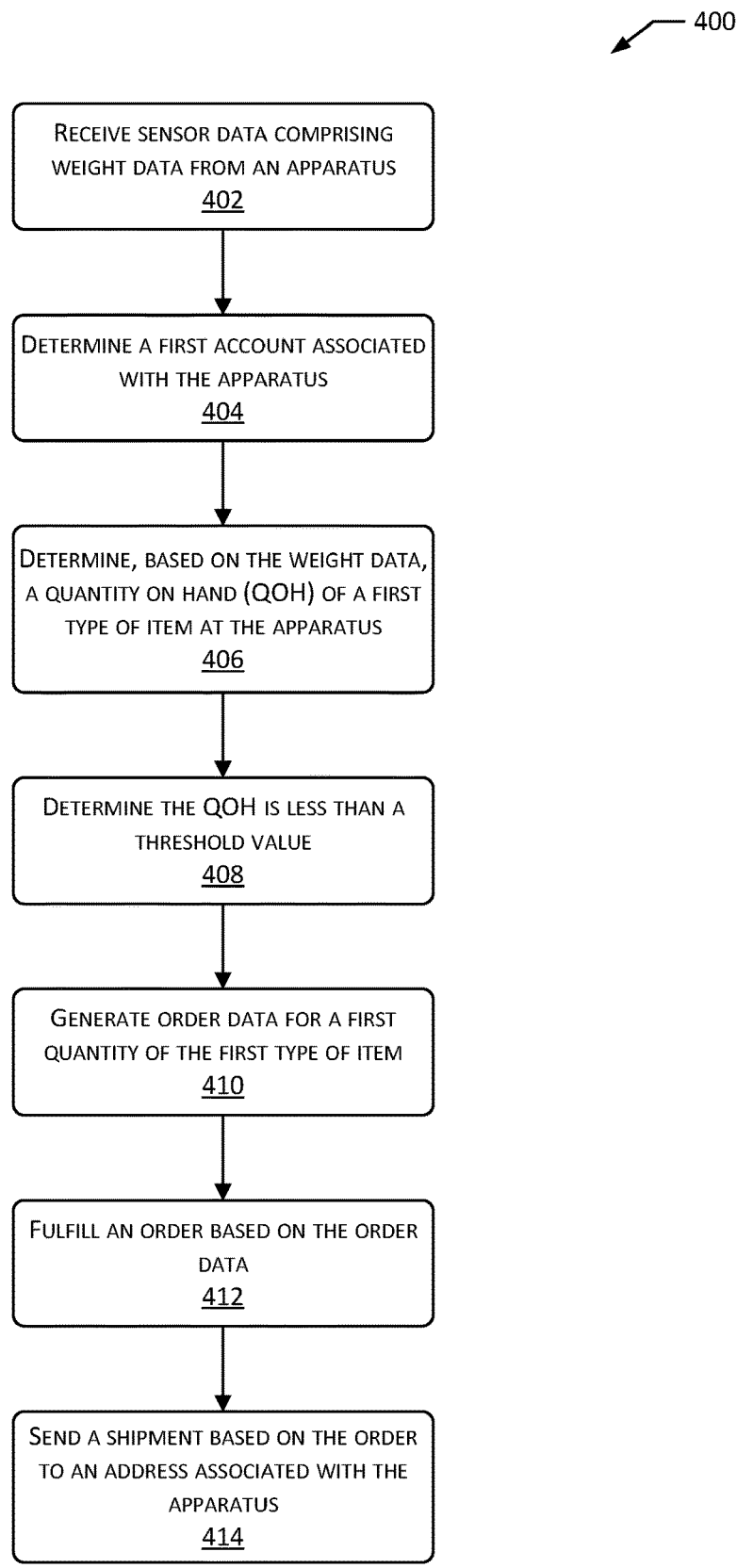
FIG. 4 is a flow diagram of a process to use the sensor data provided by the apparatus to generate an order for one or more items, according to one implementation.

FIG. 4 is a flow diagram 400 of a process to use the sensor data 172 provided by the apparatus 102 to generate order data 192 indicative of an order for one or more items 106, according to one implementation. The process may be implemented by the inventory management system 190.

At 402 the sensor data 172 is received from the apparatus 102. The sensor data 172 may comprise one or more of the weight data 180, the temperature data 182, and so forth. The apparatus 102 may also send the apparatus identifier 170 with the sensor data 172.

At 404 a first account associated with the apparatus 102 is determined. For example, the apparatus identifier 170 may be used to retrieve information indicative of the first account. The first account may include billing data, shipping address, and so forth.

At 406, based on the weight data 180, a quantity on hand (QOH) of a first type of item 106 at the apparatus 102 is determined. For example, the weight data 180 may be divided by a per item weight for the type of item 106 that is associated with the apparatus identifier 170 to determine the QOH.

At 408 the QOH is determined to be less than a threshold value that is indicative of a restocking level. In one implementation the threshold value indicative of the restocking level may be predetermined. In another implementation the threshold value indicative of the restocking level may be specified by the user 108, an administrator, and so forth.

At 410 order data 192 is generated for a first quantity of the first type of item 106. In one implementation, the first quantity may be determined as a difference between the QOH and a maximum quantity that may be stowed at the apparatus 102. The order data 192 may specify the first type of item 106, the first quantity, account to bill to, shipment address, and so forth.

At 412, an order is fulfilled based on the order data 192. For example, the order data 192 may be sent to a distribution center where the first quantity of the types of item 106 specified in the order data 192 are picked and packaged for shipment.

At 414 a shipment is sent. For example, the shipment may include the order to the address associated with the apparatus 102. Once received, the shipment may be used to restock the items 106 stowed by the apparatus 102.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques and devices described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. An apparatus comprising:
   a battery;
   one or more sensors;
   a wifi interface;
   a first processor;
   a second processor, wherein the second processor uses less electrical power during operation than the first processor;
   a clock;
   a first memory storing computer-executable instructions executed by the first processor to:
      send, at a first time, computer-executable instructions to the second processor;
      receive, at a second time, sensor data from the second processor; and
      send, at a third time, the sensor data to an external device using the wifi interface; and
   a second memory storing computer-executable instructions executed by the second processor to:
      direct, at a fourth time that is before the second time, the first processor to deactivate;
      set a first timer to a first time interval, wherein the first timer uses data from the clock;
      transition to, at a fifth time that is before the second time, a sleep mode;
      determine the first timer has expired at a sixth time that is before the second time;
      transition to a wake mode at a seventh time that is after the sixth time and before the second time;
      acquire, at an eighth time that is before the second time, the sensor data from the one or more sensors;
      determine the sensor data is to be sent to the external device;
      direct the first processor to activate at a ninth time that is before the second time; and
      send, at the second time, the sensor data to the first processor.

2. The apparatus of claim 1, wherein the computer-executable instructions executed by the second processor to determine the sensor data is to be sent to the external device comprise one or more instructions to:
   set a second timer to a second time interval, wherein the second time interval is greater than the first time interval;
   determine a count of the sensor data that has been acquired exceeds a first threshold value;
   determine a time interval since last use of the first processor to send the sensor data has exceeded a second threshold value; or
   determine a difference between a first value of the sensor data and a second value of the sensor data exceeds a third threshold value.

3. The apparatus of claim 1, further comprising a power management unit to provide electrical power to the first processor; and
   the second processor comprising a first line connected to the power management unit;
   wherein the second processor asserts a first voltage at the first line to direct the power management unit to deactivate or activate.

4. The apparatus of claim 1, the computer-executable instructions executed by the second processor further to:
   determine a first voltage provided by the battery;
   determine, based on the first voltage, the first time interval; and
   wherein the computer-executable instructions executed by the second processor to determine the sensor data is to be sent to the external device are based on the first voltage.

5. The apparatus of claim 1, the computer-executable instructions executed by the first processor further to:

receive, using the wifi interface, first data indicative of a second time interval during which the apparatus is to send the sensor data to the external device; and wherein the computer-executable instructions executed by the second processor to direct the first processor to activate comprise instructions to:

determine, using the clock, a current time; and determine the current time is within the second time interval.

6. The apparatus of claim 1, the computer-executable instructions executed by the second processor further to:

transition to, at a tenth time that is after the ninth time and before the second time, the sleep mode; and the computer-executable instructions executed by the first processor further to:

determine, at an eleventh time that is after the tenth time and before the second time, that the second processor is in the sleep mode; and direct, at a twelfth time that is after the eleventh time and before the second time, the second processor to transition to the wake mode.

7. The apparatus of claim 1, further comprising:

an output device connected to the second processor; and the computer-executable instructions executed by the second processor further to, while the first processor is deactivated:

operate the output device.

8. The apparatus of claim 1, further comprising:

a power source; and the computer-executable instructions executed by the second processor further to:

determine the power source is providing electrical power to the apparatus at a tenth time;

maintain the first processor in an activated state; and maintain the second processor in the wake mode.

9. The apparatus of claim 1, the one or more sensors comprising one or more of:

a weight sensor, a temperature sensor, an inertial measurement unit, or a hygrometer.

10. An apparatus comprising:

a battery;

a wi-fi interface;

a first processor that is connected to the wi-fi interface and that uses a first amount of electrical power from the battery while activated;

a sensor;

a second processor that is connected to the first processor and the sensor, wherein the second processor uses a second amount of electrical power from the battery while activated, and the second amount of electrical power is less than the first amount of electrical power;

a clock;

the first processor to:

at a first time, send computer-executable instructions to the second processor;

the second processor to execute the computer-executable instructions to:

direct the first processor to deactivate, set a first timer to a first time interval, wherein the first timer uses data from the clock;

transition the second processor to a sleep mode, determine the first timer has expired;

based on the first timer having expired, transition the second processor from the sleep mode to a wake mode;

acquire sensor data from the sensor, determine that the sensor data is to be sent, direct the first processor to activate, and send the sensor data to the first processor; and the first processor further to:

at a second time, after being activated by the second processor;

receive the sensor data; and send the sensor data using the wi-fi interface.

11. The apparatus of claim 10, wherein the second processor determines the sensor data is to be sent based on one or more of:

expiration of a second time interval associated with sending the sensor data;

a count of samples of the sensor data exceeds a first threshold value; or a difference between a first value and a second value of the sensor data exceeds a second threshold value.

12. The apparatus of claim 10, further comprising a power management unit that controls delivery of electrical power to the first processor and the wi-fi interface; and wherein the second processor uses the power management unit to direct the first processor to activate and deactivate.

13. The apparatus of claim 10, the second processor to further execute the computer-executable instructions to:

transition to the sleep mode after the first processor is directed to activate;

receive a signal from the first processor indicating the first processor is ready for the sensor data;

responsive to the signal, transition the second processor from the sleep mode to the wake mode; and wherein the second processor sends the sensor data to the first processor after the second processor is transitioned from the sleep mode to the wake mode.

14. A computer-implemented method comprising:

sending, from a first processor in an apparatus to a second processor in the apparatus, a first set of instructions;

sending, from the second processor to the first processor, a first signal to direct the first processor to deactivate;

setting a first timer to a first time interval;

transitioning the second processor to a sleep mode for the first time interval, wherein the sleep mode consumes less electrical power than a wake mode;

determining the first timer has expired;

transitioning the second processor from the sleep mode to the wake mode;

acquiring, using the second processor, sensor data from one or more sensors of the apparatus;

determining, using the second processor, that the sensor data is to be sent to an external device;

sending, from the second processor to the first processor, a second signal to direct the first processor to activate;

sending the sensor data from the second processor to the first processor;

receiving, at the first processor, the sensor data; and sending the sensor data from the first processor to the external device using a wifi interface of the apparatus.

15. The computer-implemented method of claim 14, the determining that the sensor data is to be sent to the external device comprising one or more of:

determining expiration of a second timer;

determining a count of entries in the sensor data that has been acquired exceeds a first threshold value;

determining a time interval since last use of the first processor to send the sensor data has exceeded a second threshold value; or determining a variation between a first value of the sensor data and a second value of the sensor data exceeds a third threshold value.

16. The computer-implemented method of claim 14, further comprising:
    sending, from the first processor to the second processor, a threshold value; and
    the determining that the sensor data is to be sent to the external device comprising:
        determining, using the second processor, that one or more values of the sensor data are less than the threshold value.

17. The computer-implemented method of claim 14, further comprising:
    determining the first time interval based on one or more of:
        the first set of instructions,
        a battery voltage, or
        a variation between a first value of the sensor data and a second value of the sensor data that exceeds a first threshold value.

18. The computer-implemented method of claim 14, further comprising:
    after sending the second signal, transitioning the second processor to the sleep mode; and
    sending, from the first processor to the second processor, a third signal to transition the second processor from the sleep mode to the wake mode after the first processor has been activated and is ready to receive the sensor data.

19. The computer-implemented method of claim 14, further comprising:
    deactivating the first processor responsive to one or more of:
        determining that an address has not been received within a second time interval after requesting the address using a network interface;
        determining that no response has been received from the external device within a third time interval after a network connection has been established;
        determining that a fourth time interval beginning at activation of the first processor has expired; or
        determining an update to one or more of the first processor or the second processor is in progress and that a fifth time interval beginning at activation of the first processor has expired, wherein the fifth time interval is greater than the fourth time interval.

20. The computer-implemented method of claim 14, further comprising:
    receiving, at a third processor, the sensor data and data indicative of the apparatus;
    determining a first account associated with the apparatus; and
    determining, based at least in part on the sensor data and the first account, first order data for a first quantity of a first type of item and the first order data includes information indicative of the apparatus.

* * * * *